(12) United States Patent
Sada et al.

(10) Patent No.: US 6,537,673 B2
(45) Date of Patent: Mar. 25, 2003

(54) INFRARED TRANSMITTING FILM AND INFRARED-SENSOR COVER USING SAME

(75) Inventors: Toshihiko Sada, Kanagawa (JP); Tetsuya Asada, Kanagawa (JP); Tamami Ootsuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/948,608

(22) Filed: Sep. 10, 2001

(65) Prior Publication Data

US 2002/0041968 A1 Apr. 11, 2002

(30) Foreign Application Priority Data

Oct. 5, 2000 (JP) ........................................ 2000-305783

(51) Int. Cl.[7] ............................ B32B 17/06; F21V 9/06; B60J 3/00
(52) U.S. Cl. .................... 428/432; 252/587; 296/97.2; 428/426
(58) Field of Search ........................ 252/587; 296/97.2; 428/212

(56) References Cited

U.S. PATENT DOCUMENTS

| 5,200,851 A | * | 4/1993 | Coderre et al. | ............. 359/351 |
| 5,712,024 A | * | 1/1998 | Okuzaki et al. | ............. 428/143 |
| 6,072,391 A | * | 6/2000 | Suzuki et al. | ............... 340/468 |

* cited by examiner

*Primary Examiner*—Deborah Jones
*Assistant Examiner*—G. Blackwell-Rudasill
(74) *Attorney, Agent, or Firm*—Foley & Lardner

(57) ABSTRACT

An infrared transmitting film includes a mirror-coat layer having a lamination of high-refractive-index material layers and low-refractive-index material layers, and a color-material layer placed on the mirror-coat layer and for absorbing visible light in a given wavelength range and transmitting infrared ray. The film has 80% or more transmission factor for infrared ray.

19 Claims, 3 Drawing Sheets

FIG.3

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| COATING THICKNESS OF BLACK COLOR MATERIAL | 19μm | 34μm | 51μm | 62μm | 11μm | 18μm | 36μm |
| INFRARED TRANSMISSION FACTOR OF COLD MIRROR | 90% | 90% | 90% | 90% | 90% | 90% | 90% |
| INFRARED TRANSMISSION FACTOR OF BLACK COLOR MATERIAL | 100% | 100% | 100% | 99% | 88% | 80% | 71% |
| VISIBLE-LIGHT TRANSMISSION FACTOR OF BLACK COLOR MATERIAL | 23% | 9% | 4% | 2% | 21% | 9% | 5% |

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|---|---|---|
| COATING THICKNESS OF BLACK COLOR MATERIAL | 17μm | 28μm | 45μm | 53μm | 14μm | 24μm | 39μm | 51μm | 10μm |
| INFRARED TRANSMISSION FACTOR OF COLD MIRROR | 90% | 90% | 90% | 90% | 90% | 90% | 90% | 90% | 90% |
| INFRARED TRANSMISSION FACTOR OF BLACK COLOR MATERIAL | 69% | 52% | 46% | 40% | 84% | 72% | 56% | 46% | 0% |
| VISIBLE-LIGHT TRANSMISSION FACTOR OF BLACK COLOR MATERIAL | 16% | 4% | 1% | 0.5% | 82% | 72% | 55% | 44% | 0% |

INFRARED TRANSMITTING FILM AND INFRARED-SENSOR COVER USING SAME

BACKGROUND OF THE INVENTION

The present invention relates to infrared transmitting films and infrared-sensor covers and infrared-sensor units using same, and more particularly, to the infrared transmitting films and the infrared-sensor covers and infrared-sensor units using same, which are suitable for sensors for sensing a distance to a preceding vehicle such as motor vehicle.

Generally, infrared sensors have been used with transparent or semitransparent infrared transmitting cover. However, such infrared transmitting cover allows a sensor main body to be seen from the outside, leading to possible degradation in design quality. Moreover, if a carbon black or the like for absorbing visible light is contained in the infrared-sensor cover to conceal the sensor main body, the cover can achieve the object of concealment, but loses the transmission-ability for infrared ray.

Moreover, when the infrared sensor is arranged at the back of a radiator grille for, e.g. motor vehicles to measure an inter-vehicle distance, the radiator grille, which forms an obstacle to the infrared sensor, should be eliminated completely or removed partly to secure an optical path of infrared ray.

SUMMARY OF THE INVENTION

On the other hand, the radiator grille is an important portion in terms of vehicle design, and therefore requires high design quality. It is a recent tendency to apply plating to the radiator grille to enhance the visual quality. Thus, there is a great demand for infrared-sensor covers having luster or brilliance like plating.

It is, therefore, an object of the present invention to provide infrared transmitting films which allow compatibility between the transmission-ability for infrared ray and the concealment of the infrared-sensor main body, and provide design quality having luster or brilliance like plating. Another object of the present invention is to provide infrared-sensor covers and infrared-sensor units using such infrared transmitting films.

The present invention generally provides a film for transmitting infrared ray, comprising:
a mirror-coat layer comprising a lamination of a first layer and a second layer, the first layer having a refractive index greater than that of the second layer; and
a color-material layer placed on the mirror-coat layer, the color-material layer comprising at least one color material and a binder, wherein the color-material layer absorbs visible light in a given wavelength range and transmits infrared ray,
wherein the film has 80% or more transmission factor for infrared ray.

One aspect of the present invention is to provide a cover for an infrared sensor, comprising:
a base material with transmission-ability for infrared ray; and
a film that transmits infrared ray, the film being disposed adjacent to the base material, the film comprising:
a mirror-coat layer comprising a lamination of a first layer and a second layer, the first layer having a refractive index greater than that of the second layer; and
a color-material layer placed on the mirror-coat layer, the color-material layer comprising at least one color material and a binder, wherein the color-material layer absorbs visible light in a given wavelength range and transmits infrared ray,
wherein the film has 80% or more transmission factor for infrared ray,
wherein the cover has 70% or more transmission factor for infrared ray.

Still another aspect of the present invention is to provide, in an infrared-sensor unit:
a cover, comprising:
a base material with transmission-ability for infrared ray; and
a film that transmits infrared ray, the film being disposed adjacent to the base material, the film comprising:
a mirror-coat layer comprising a lamination of a first layer and a second layer, the first layer having a refractive index greater than that of the second layer; and
a color-material layer placed on the mirror-coat layer, the color-material layer comprising at least one color material and a binder, wherein the color-material layer absorbs visible light in a given wavelength range and transmits infrared ray,
wherein the film has 80% or more transmission factor for infrared ray,
wherein the cover has 70% or more transmission factor for infrared ray.

BRIEF DESCRIPTION OF THE DRAWINGS

The other objects and features of the present invention will become apparent from the following description with reference to the drawings, wherein:

FIG. 3 is a table illustrating the results of evaluation of various infrared-sensor covers.

DETAILED DESCRIPTION OF THE INVENTION

Figure 1:
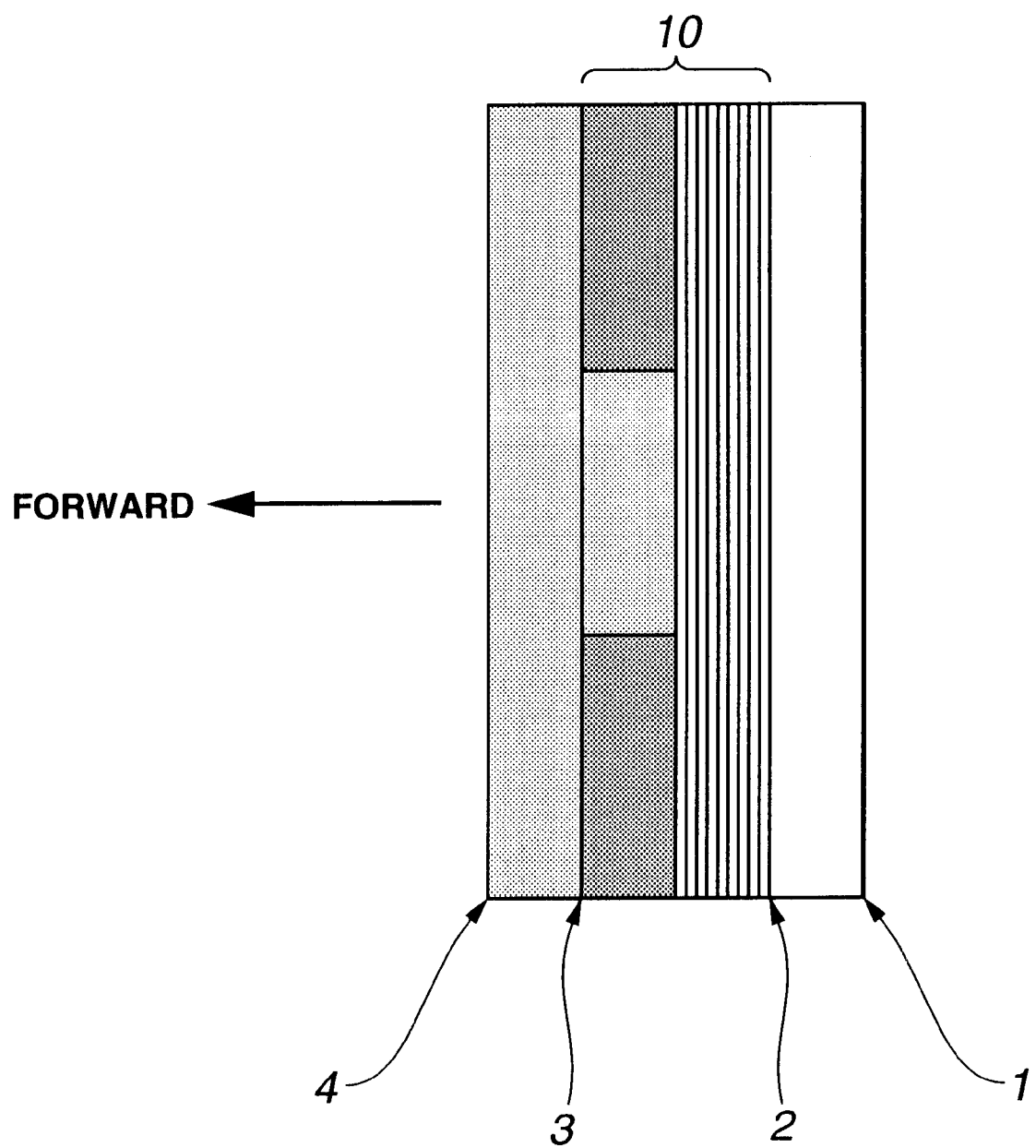
FIG. 1 is a sectional view showing an embodiment of an infrared-sensor cover according to the present invention.

Referring to the drawings, an infrared transmitting film embodying the present invention will be described in detail. It is noted that the denotation "%" shows mass percentage unless otherwise specified in the disclosure.

The infrared transmitting film comprises wholly or partly a laminate structure having a mirror-coat layer and a color-material layer placed thereon.

The mirror-coat layer is obtained by alternately laminating a high-refractive-index layer or layers and a low-refractive-index layer or layers. The adoption of such laminate structure allows coated items to not only provide luster or brilliance like plating and thus high visual quality, but improve the masking ability.

Examples of high-refractive-index and low-refractive-index materials for mirror-coat layer are $CaF_2$, NaF, $Na_3AlF_6$, LiF, $MgF_2$, $SiO_2$, $LaF_3$, $NdF_3$, $Al_2O_3$, $CeF_3$, $PbF_2$, MgO, $ThO_2$, $SnO_2$, $La_2O_3$, SiO, $In_2O_3$, $Nd_2O_3$, $Sb_2O_3$, $ZrO_2$, $CeO_2$, $TiO_2$, ZnS, $Bi_2O_3$, ZnSe, CdS, $Sb_2S_3$, CdTe, Si, Ge, Te, and PbTe. A combination of one high-refractive-index material and one low-refractive-index material can arbitrarily be selected therefrom for application. The refractive index is preferably 1.5–5.5 for the high-refractive-index material and 1.2–3.0 for the low-refractive-index material.

The lamination of such materials allows coated items to not only provide brilliance like plating and thus high visual quality, but improve the masking ability.

The high-refractive-index and low-refractive-index materials is formed preferably in a thin layer of about 0.1–0.2 μm by means of the vacuum evaporation method, the ion plating method, the sputtering method, etc. The mirror-coat layer can include, for example, 30 layers of $TiO_2$ and $SiO_2$ laminated alternately.

The color-material layer comprises at least one color material, and has the function of absorbing visible light in a given wavelength range and allowing passage of infrared ray. The wavelength range of visible light absorbed by the color-material layer is preferably 400–700 nm, since this enables achievement of an infrared transmitting film having a desired masking ability.

The color materials can include a dye and a pigment which allow passage of infrared ray in the wavelength range of 750–1,000 nm. Typical examples are cadmium red, cobalt blue, isoindolinone, phthalocyanine blue, indanthrene blue, perylene red, bismuth yellow, and azo compounds. Such color materials can be used alone or in combination of two or more.

Preferably, the color-material layer has a commonly-known coat-forming polymer added thereto as a binder component for color material. Examples of the binder component are acrylic resin, alkyd resin, polyester resin, polyurethane resin, amino resin, etc. Moreover, it can be added a hardener including alkoxymethylolmelamine resin, isocyanate or block isocyanate resin, polyacid anhydride and polyepoxy compound, and a coat-forming agent including polymer which forms a coat at volatilization of a solvent, such as nitrocellulose resin or macromolecular acrylic resin, and polymer which forms a coat by reaction with oxygen and moisture in the air, such as alkyd resin. Furthermore, it can be added a solvent which can dissolve or disperse the hardener and the coat-forming agent, such as toluene, xylene, butyl acetate, methyl acetate, methyl ethyl ketone, methyl isobutylene ketone, butyl alcohol, aliphatic hydrocarbon, or aromatic hydrocarbon. An inorganic solvent such as water may be use in place of an organic solvent.

The infrared transmitting film features 80% or more transmission factor for infrared ray. With less than 80% infrared transmission factor, the infrared transmitting film applied to part of an infrared-sensor cover causes a degradation of the capability thereof. In view of 90–100% infrared transmission factor, it is desirable for the mirror-coat layer to secure a desired infrared transmission factor by adjusting the mixing amount of a color material and the thickness of the color-material layer. By way of example, the mixing amount of a color material may be about 0.1–100 weight portions with respect to 100 weight portions of the binder component.

The infrared-sensor cover will be described. The infrared-sensor cover is obtained by placing the infrared transmitting film on the whole or part of a surface and/or an underside of an infrared transmitting base material. This allows the cover of a desired shape to be disposed even on an optical path of infrared ray for an infrared sensor, enabling not only achievement of concealment of the infrared sensor, but visual design quality thereof.

Figure 2:
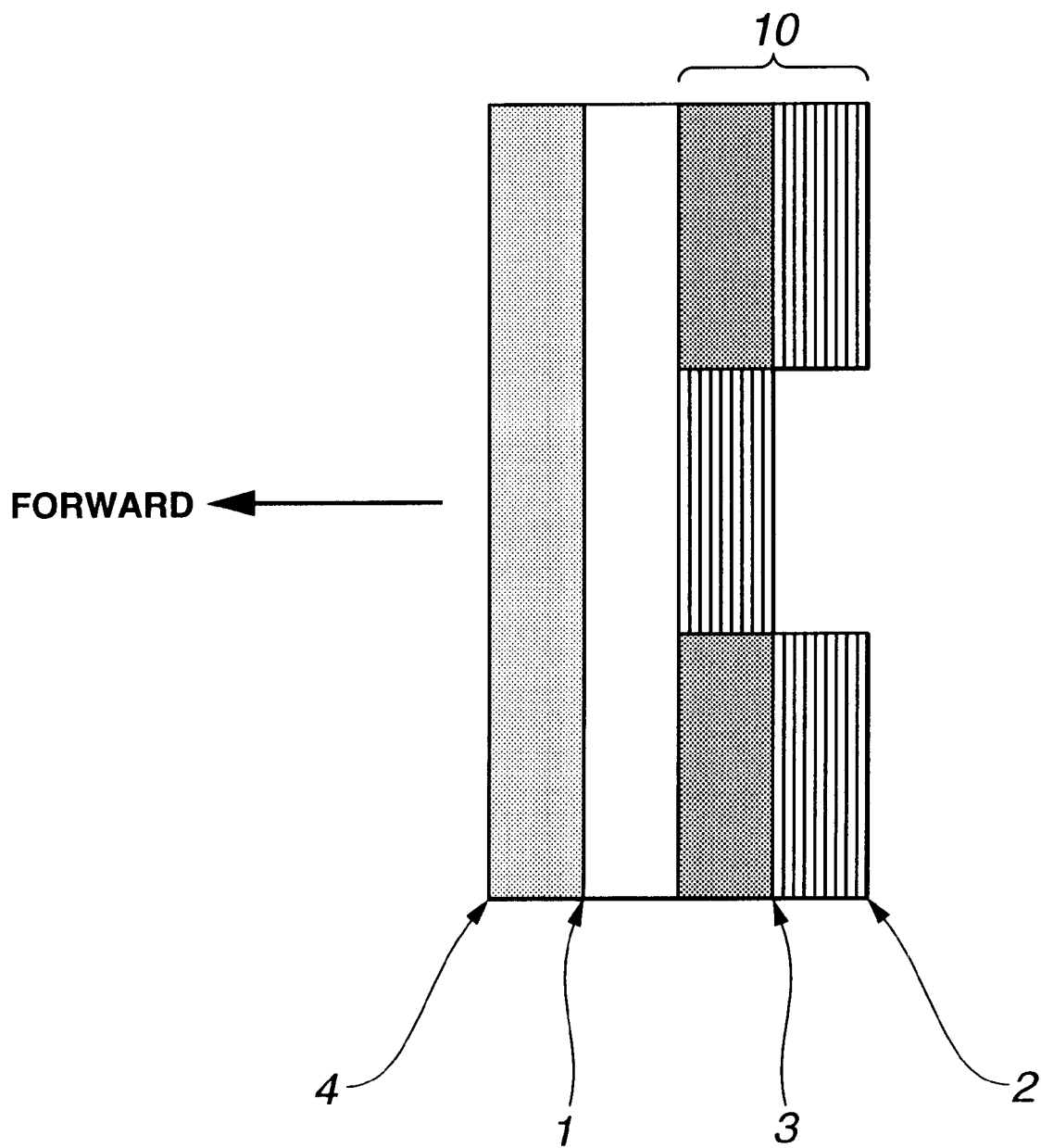
FIG. 2 is a view similar to FIG. 1, showing another embodiment of the present invention.

Referring to FIGS. 1–2, there are shown illustrative examples of the infrared-sensor cover. The example in FIG. 1 comprises an infrared transmitting film 10 (mirror-coat layer 2 and color material 3), an infrared transmitting base material 1 placed on the underside of the film 10, and a protective-material layer 4 placed on the surface thereof. The example in FIG. 2 comprises infrared transmitting film 10 and infrared transmitting base material 1 and protective-material layer 4 placed on the surface of the film 10.

The infrared transmitting base material may be commonly-used transparent or semitransparent base material having infrared transmission factor. Concrete examples are glass; acrylic resin including (meth)acrylic ester polymer or copolymer such as polymethyl (meth)acrylate, polyethyl (meth)acrylate, polybutyl (meth)acrylate or copolymer of methyl (meth)acrylate and butyl (meth)acrylate; thermoplastic polyester resin such as polyethylene terephthalate, polybutylene terephthalate or copolymer of ethylene terephthalate and isophthalate; polyolefine resin such as polyethylene, polypropylene or olefinic thermoplastic elastomer; fluorine-contained resin such as polyvinyl fluoride, polyvinylidene fluoride, polytetrafluoroethylene or copolymer of ethylene and tetrafluoroethylene; vinyl resin such as polyvinyl chloride or polyvinyl acetate; carbonate resin such as polycarbonate; polyether resin, and polyurethane resin. Those resins can be used alone or in any combination of two or more.

The infrared-sensor cover features 70% or more transmission factor for infrared ray. With less than 70% infrared transmission factor, the infrared-sensor cover forms an obstacle on an optical path of infrared ray to make normal operation of the infrared sensor difficult.

The protective-material layer can be placed on the whole or part of the surface of the infrared-sensor cover to enhance damageability and weather resistance of the cover. Typical examples of protective materials contained in the protective-material layer are acrylic silicone paint, silicone denatured alkyd paint, and silicone denatured urethane paint.

The protective material can be an ultraviolet absorbent having absorption spectrum in the ultraviolet range and allowing passage of visible light and infrared ray. The addition of the ultraviolet absorbent is effective, since the protective material provides further enhanced weather resistance of the infrared-sensor cover. Preferably, the ultraviolet absorbent fails to absorb light in the wavelength range from visible light to infrared light. Concrete examples of the ultraviolet absorbent are benzotriazole, benzophenone, benzoate, and cyanoacrylate. In addition to the ultraviolet absorbent, a hindered-amine light stabilizer can be added to the protective material so as to further enhance weather resistance of the infrared-sensor cover. Moreover, the ultraviolet absorbent and the light stabilizer are preferably about 0.1–10 weight portions with respect to 100 weight portions of a resin.

An infrared-sensor unit will be described. The infrared-sensor unit features provision of the above infrared-sensor cover. This allows the inventive infrared-sensor unit to provide not only higher masking capability of the infrared sensor than that of the conventional infrared-sensor unit without any degrading the function of the infrared sensor, but free design of the shape, etc. for improved design quality.

Referring to FIG. 3, the present invention will be described more in detail with reference to examples and comparative examples. In each of the examples and the comparative examples, the infrared-sensor cover having structure as shown in FIG. 1 is manufactured and measured on the transmission factors for infrared ray and visible light. The infrared-sensor cover includes a part with a color-material layer and a part with no color-material layer by means of arbitrary shaped masking.

EXAMPLES 1–4

The infrared-sensor cover was obtained as follows. 30 layers of cold mirror of $TiO_2$—$SiO_2$ are placed on the surface of the infrared-sensor cover of transparent polycarbonate (LS2 manufactured by Nippon GE Plastics). With arbitrary shaped masking given thereon, acrylic-urethane paint (R241 manufactured by NIPPON BEE CHEMICALS, CO., LTD.) containing 0.8 weight portions of an azo black dye (KAYASET BLACK manufactured by NIPPON KAYAKU CO., LTD.) with respect to 100 weight portions of a resin is applied to have 19–62 μm dry film thickness.

EXAMPLES 5–7

The infrared-sensor cover was obtained in the same way as in the examples 1–4 except that acrylic-urethane paint (R241 manufactured by NIPPON BEE CHEMICALS, CO., LTD.) containing 2.5 weight portions of an mixed pigment containing equal parts of a perylene red pigment (PERRINDO Maroon R6436 manufactured by Bayer Ltd.), a cyanine blue pigment (CYANINE Blue G314 manufactured by SANYO COLOR WORKS, LTD.), and a bismuth yellow pigment (IRGACOLOR Yellow 2GLMA manufactured by CIBA SPECIALITY CHEMICALS Inc.) with respect to 100 weight portions of the resin is applied to have 11–36 μm dry film thickness.

Comparative Examples 1–4

The infrared-sensor cover was obtained in the same way as in the examples 1–4 except that acrylic-urethane paint (R241 manufactured by NIPPON BEE CHEMICALS, CO., LTD.) containing 2.5 weight portions of a black infrared reflective transmitting pigment (CHROMOFINE Black manufactured by Dainichiseika Color & Chemicals Mfg. Co., Ltd.) with respect to 100 weight portions of the resin is applied to have 17–53 μm dry film thickness.

Comparative Examples 5–8

The infrared-sensor cover was obtained in the same way as in the examples 1–4 except that acrylic-urethane paint (R241 manufactured by NIPPON BEE CHEMICALS, CO., LTD.) containing 1.25 weight portions of a black infrared reflective pigment (PALIOGEN Black manufactured by BASF Japan Ltd.) with respect to 100 weight portions of the resin is applied to have 14–51 μm dry film thickness.

Comparative Example 9

The infrared-sensor cover was obtained in the same way as in the examples 1–4 except that acrylic-urethane paint (R241 (BKH3) manufactured by NIPPON BEE CHEMICALS, CO., LTD.) containing a black pigment or carbon black is applied to have 10 μm dry film thickness.

Performance Evaluations

The spectral transmission factor at 400–900 nm was measured with regard to a masked portion (with no color-material layer) and a black-color-material placed portion (with a color-material layer) of each of the infrared-sensor covers with an UV/Vis Recording Spectrophotometer (UV-265FV manufactured by Shimadzu Corporation). The spectral transmission factor at 850 nm was taken as transmission factor for infrared ray. Moreover, the visible-light transmission factor of the color-material layer was measured with a transparent PET film having the same color material of the same coating thickness placed thereon in all the examples and the comparative examples. The spectral transmission factor at 500 nm was taken as transmission factor for visible light. If 20% or less, it was considered to be masked. FIG. 3 shows the results of evaluation of the examples and the comparative examples.

FIG. 3 reveals that the infrared-sensor covers in the examples 1–4 and 5–7, which are preferred embodiments of the present invention, have infrared transmission factor hardly reduced and maintained over 70% even with an increase in the coating thickness. On the other hand, it is seen from FIG. 3 that the infrared-sensor covers in the comparative examples 1–4, 5–8, and 9, which are out of preferred embodiment of the present invention, fail to have desired transmission factors for infrared ray and visible light.

Having described the present invention with regard to the preferred embodiments, it is to be understood that the present invention is not limited thereto, and various changes and modifications can be made without departing from the scope of the present invention. By way of example, the protective-material layer may be obtained by mixing the protective material to at least one of the infrared transmitting base material, the mirror-coat layer, and the color-material layer. Moreover, component parts of the infrared-sensor cover such as infrared transmitting base material, color-material layer and protective-material layer may contain an appropriate amount of additive agents such as filler and reinforcing agent including light stabilizer, lubricant, antistatic agent, and antioxidant.

The entire teachings of Japanese Patent Application P2000-305783 are incorporated hereby by reference.

What is claimed is:

1. A film for transmitting infrared ray, comprising:
a mirror-coat layer comprising a lamination of a first layer and a second layer, the first layer having a refractive index greater than that of the second layer; and
a color-material layer placed: on the mirror-coat layer, the color-material layer comprising at least one color material and a binder, wherein the color-material layer absorbs visible light in a given wavelength range and transmits infrared ray,
wherein the film has 80% or more transmission factor for infrared ray.

2. The film as claimed in claim 1, wherein the refractive index of the first layer is 1.5–5.5, and the refractive index of the second layer is 1.2–3.0.

3. The film as claimed in claim 2, wherein each of the first and second layers has 0.1–0.2 μm thickness.

4. The film as claimed in claim 2, wherein the first and second layers of the mirror-coat layer are formed out of materials selected from the group consisting of $CaF_2$, NaF, $Na_3AlF_6$, LiF, $MgF_2$, $SiO_2$, $LaF_3$, $NdF_3$, $Al_2O_3$, $CeF_3$, $PbF_2$, MgO, $ThO_2$, $SnO_2$, $La_2O_3$, SiO, $In_2O_3$, $Nd_2O_3$, $Sb_2O_3$, $ZrO_2$, $CeO_2$, $TiO_2$, ZnS, $Bi_2O_3$, ZnSe, CdS, $Sb_2S_3$, CdTe, Si, Ge, Te, and PbTe.

5. The film as claimed in claim 1, wherein the given wavelength range of the color-material layer is 400–700 nm.

6. The film as claimed in claim 5, wherein the color material of the color-material layer comprises a dye and a pigment.

7. The film as claimed in claim 6, wherein the color material is 0.1–100 weight portions with respect to 100 weight portions of the binder.

8. A cover for an infrared sensor, comprising:
a base material with transmission-ability for infrared ray; and
a film that transmits infrared ray, the film being disposed adjacent to the base material, the film comprising:
a mirror-coat layer comprising a lamination of a first layer and a second layer, the first layer having a refractive index greater than that of the second layer; and a color-material layer placed on the mirror-coat layer, the color-material layer comprising at least one color material and a binder, wherein the color-material layer absorbs visible light in a given wavelength range and transmits infrared ray, wherein the film has 80% or more transmission factor for infrared ray, wherein the cover has 70% or more transmission factor for infrared ray.

9. The cover as claimed in claim 8, wherein the film fully conceals the base material.

10. The cover as claimed in claim 8, wherein the film partly conceals the base material.

11. The cover as claimed in claim 8, wherein the base material is selected from the group consisting of glass, acrylic resin, thermoplastic polyester resin, polyolefine resin, fluorine-contained resin, vinyl resin, carbonate resin, polyether resin, and polyurethane resin.

12. The cover as claimed in claim 9, further comprising a protective layer disposed on a surface of the cover, the protective layer containing a protective material.

13. The cover as claimed in claim 12, wherein the protective layer conceals an entire surface of the cover.

14. The cover as claimed in claim 12, wherein the protective layer conceals part of the surface of the cover.

15. The cover as claimed in claim 12, wherein the protective layer is formed with at least one of the base material, the mirror-coat layer, and the color-material layer.

16. The cover as claimed in claim 12, wherein the protective material is selected from the group consisting of acrylic silicone paint, silicone denatured alkyd paint, and silicone denatured urethane paint.

17. The cover as claimed in claim 12, wherein the protective material comprises an absorbent having absorption spectrum in an ultraviolet range and allowing passage of visible light and infrared ray.

18. The cover as claimed in claim 17, wherein the absorbent is 0.1–10 weight portions with respect to 100 weight portions of the resin.

19. In an infrared-sensor unit:

a cover, comprising:

a base material with transmission-ability for infrared ray; and a film that transmits infrared ray, the film being disposed adjacent to the base material, the film comprising:

a mirror-coat layer comprising a lamination of a first layer and a second layer, the first layer having a refractive index greater than that of the second layer; and a color-material layer placed on the mirror-coat layer, the color-material layer comprising at least one color material and a binder, wherein the color-material layer absorbs visible light in a given wavelength range and transmits infrared ray, wherein the film has 80% or more transmission factor for infrared ray, wherein the cover has 70% or more transmission factor for infrared ray.

\* \* \* \* \*